United States Patent
Bohne et al.

(10) Patent No.: US 6,692,179 B2
(45) Date of Patent: Feb. 17, 2004

(54) SPHERICAL SLEEVE JOINT

(75) Inventors: Manfred Bohne, Quernheim (DE); Klaus Lampe, Stemshorn (DE); Stefan Husmann, Ströhen (DE); Franz-Josef Wehri, Damme (DE); Stefan Klumpe, Osterkappeln (DE)

(73) Assignee: ZF Lemförder Metallwaren AG, Lemförde (DE)

( * ) Notice: Subject to any disclaimer, the term of this patent is extended or adjusted under 35 U.S.C. 154(b) by 7 days.

(21) Appl. No.: 10/019,162

(22) PCT Filed: May 14, 2001

(86) PCT No.: PCT/DE01/01818

§ 371 (c)(1),
(2), (4) Date: Dec. 20, 2001

(87) PCT Pub. No.: WO01/88394

PCT Pub. Date: Nov. 22, 2001

(65) Prior Publication Data

US 2002/0114661 A1 Aug. 22, 2002

(30) Foreign Application Priority Data

May 15, 2000 (DE) .......................................... 100 23 602

(51) Int. Cl.⁷ .............................. F16C 11/00; F16D 1/12
(52) U.S. Cl. ...................... 403/141; 403/140; 403/132; 384/203
(58) Field of Search ................................ 403/122, 135, 403/141–143, 128, 359.1; 384/203

(56) References Cited

U.S. PATENT DOCUMENTS

| | | | | |
|---|---|---|---|---|
| 1,132,123 A | * | 3/1915 | Royer et al. ................... | 285/91 |
| 2,855,232 A | * | 10/1958 | Kozak .......................... | 403/132 |
| 3,160,430 A | * | 12/1964 | Gottschald ................... | 403/140 |
| 3,516,136 A | * | 6/1970 | Carter et al. ............. | 29/898.07 |
| 3,578,366 A | * | 5/1971 | Snidar ......................... | 403/140 |
| 3,801,169 A | | 4/1974 | Mullen | |
| 3,909,084 A | * | 9/1975 | Snidar et al. ................ | 384/203 |
| 4,069,864 A | * | 1/1978 | Novoryta et al. ............. | 165/86 |
| 4,447,094 A | | 5/1984 | Trudeau et al. | |
| 4,601,603 A | * | 7/1986 | Nakayama ................... | 403/143 |
| 4,678,350 A | | 7/1987 | Statz | |
| 5,364,191 A | | 11/1994 | Gruber | |
| 6,382,865 B1 | * | 5/2002 | Paxman ...................... | 403/131 |

FOREIGN PATENT DOCUMENTS

| | | | | |
|---|---|---|---|---|
| DE | 33 41 878 | | 5/1985 | |
| DE | 34 25 334 | | 1/1986 | |
| GB | 2106173 A | * | 4/1983 | ........... F16C/11/08 |
| GB | 2 196 690 | | 5/1988 | |

* cited by examiner

Primary Examiner—Lynne H. Browne
Assistant Examiner—Jori Schiffman
(74) Attorney, Agent, or Firm—McGlew and Tuttle, P.C.

(57) ABSTRACT

A ball sleeve joint with a joint housing has a ball sleeve provided with a preferably spherically designed bearing surface. A bearing shell surrounds the bearing surface and is accommadated in a recess of the joint housing. The joint housing is formed from at least two housing parts. The housing parts have corresponding elastic toothed elements. The toothed elements are locked with one another in the assembled state of the joint housing.

14 Claims, 2 Drawing Sheets

SPHERICAL SLEEVE JOINT

FIELD OF THE INVENTION

The present invention pertains to a ball sleeve joint with a joint housing, a ball sleeve provided with a preferably spherically designed bearing surface and a bearing shell, which surrounds the bearing surface and is accommodated in a recess of the joint housing.

BACKGROUND OF THE INVENTION

Ball sleeve joints of the type described in the introduction are known, in principle, in the state of the art and are used in various designs in all areas of industry, especially also in the automobile industry. In such joints, the housing is usually manufactured from a one-part tube, preferably one made of steel, in which the other components of the ball sleeve joint are fitted within the framework of the manufacture. The manufacturing steps provide for the fitting in of a first closing ring in the housing, after which the assembly unit already provided with the bearing shell surrounding the ball sleeve is inserted into the housing and is finally fixed in the housing by means of a second closing ring, where the two closing rings also assume a certain sealing function against external contamination effects with respect to the bearing shell located on the inside.

Even though the design of the ball sleeve joints is relatively simple, non-negligible costs arise due to the number of components to be connected to one another and the resulting number of manufacturing steps especially in case of the use of large numbers of such ball sleeve joints.

SUMMARY OF THE INVENTION

An object of the present invention is therefore to improve a ball sleeve joint of the type of this class described in the introduction such that the cost of the components can be reduced on the whole by reducing the necessary number of components and simplifying the manufacturing process.

This object is accomplished according to the present invention by the joint housing being formed by at least two housing parts, wherein the housing parts have corresponding elastic toothed elements, which can be locked with one another in the assembled state of the joint housing.

The formation of the joint housing according to the present invention preferably from two housing halves substantially simplifies the assembly of the ball sleeve joint because, on the one hand, the closing rings that were previously necessary can be eliminated and, moreover, the ball sleeve to be arranged inside the joint housing can also be placed in one of the housing halves that were separated prior to the assembly substantially more easily and consequently more rapidly and more inexpensively and can be subsequently fitted together by the locking connection, which is arranged on the housing halves and is formed by the toothed elements, without applying strong forces.

To further reduce the production costs, it proved to be especially advantageous to design the housing parts as symmetrical housing halves, whose plane of symmetry is arranged at right angles to the axial longitudinal axis of the joint housing. The symmetric design makes it possible to use two housing halves of identical shape for a ball sleeve joint, which reduces the variety of components, on the one hand, and, on the other hand, eliminates additional manufacturing costs for making a mold in the case in which the housing halves are advantageously manufactured from an elastic plastic material, preferably a polymer material.

Furthermore, it proved to be advantageous to design the toothed elements for locking the housing halves as detents that are arranged at spaced locations from one another on the outer circumference of the housing parts and project in the axial longitudinal direction of the ball sleeve joint and as locking recesses arranged between the detents, wherein the detent of one housing part is in functional connection with a locking recess of another housing part in the assembled state of the joint housing. A finger-like toothed engagement of the housing halves is formed due to this design, as a result of which rotation of the housing halves, which would possibly lead to a relative movement between the housing and the bearing shell located on the inside, is ruled out with certainty.

Furthermore, it proved to be advantageous to provide the detents on their inner side pointing toward the central longitudinal axis of the joint housing with a plurality of locking cams which extend at right angles to the central longitudinal axis, are arranged in parallel next to one another and project toward the central longitudinal axis, wherein depressions are located between the locking cams. Such a design is preferably present at the locking recesses on their outside facing away from the central longitudinal axis of the joint housing. Analogously to the design of the detents, a plurality of locking cams, which extend at right angles to the central longitudinal axis, are arranged in parallel next to one another and project toward the outside, as well as depressions located between the locking cams are provided there. As one detent of one housing halve cooperates with a corresponding locking recess of the other housing half, the arrangement of the locking cams and the corresponding depressions at the detents and locking recesses makes possible the axial clamping of the two housing halves during the assembly of the ball sleeve joint, and the permanent clamping or locking can be achieved by an extremely weak force to be applied axially. Based on empirical values, this force to be applied can be estimated to be on the order of magnitude of<1 kN. At the same time, a certain axial pretension can be applied to the inner ball sleeve and the bearing shell arranged in the recess of the joint housing due to the selection of a plastic material for the housing halves.

In addition, provisions are made in an advantageous embodiment of the subject of the present invention for the recess of the joint housing for accommodating the bearing shell to be provided with a plurality of projecting cams acting as a means for securing the inserted bearing shell against rotation.

Moreover, the recess of the joint housing may have projecting bearing pads with depressions located between the bearing pads on its inner surface facing the bearing shell to be accommodated. The depressions arranged between the bearing shells lead to an additional weight reduction due to the plastic material missing there. It should also be pointed out that the use of plastic as a material for the joint housing according to the present invention already leads, in principle, to a substantial weight reduction. Moreover, both contact corrosion and surfaces prone to corrosion on the housing in general are avoided by the use of plastic.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 2:
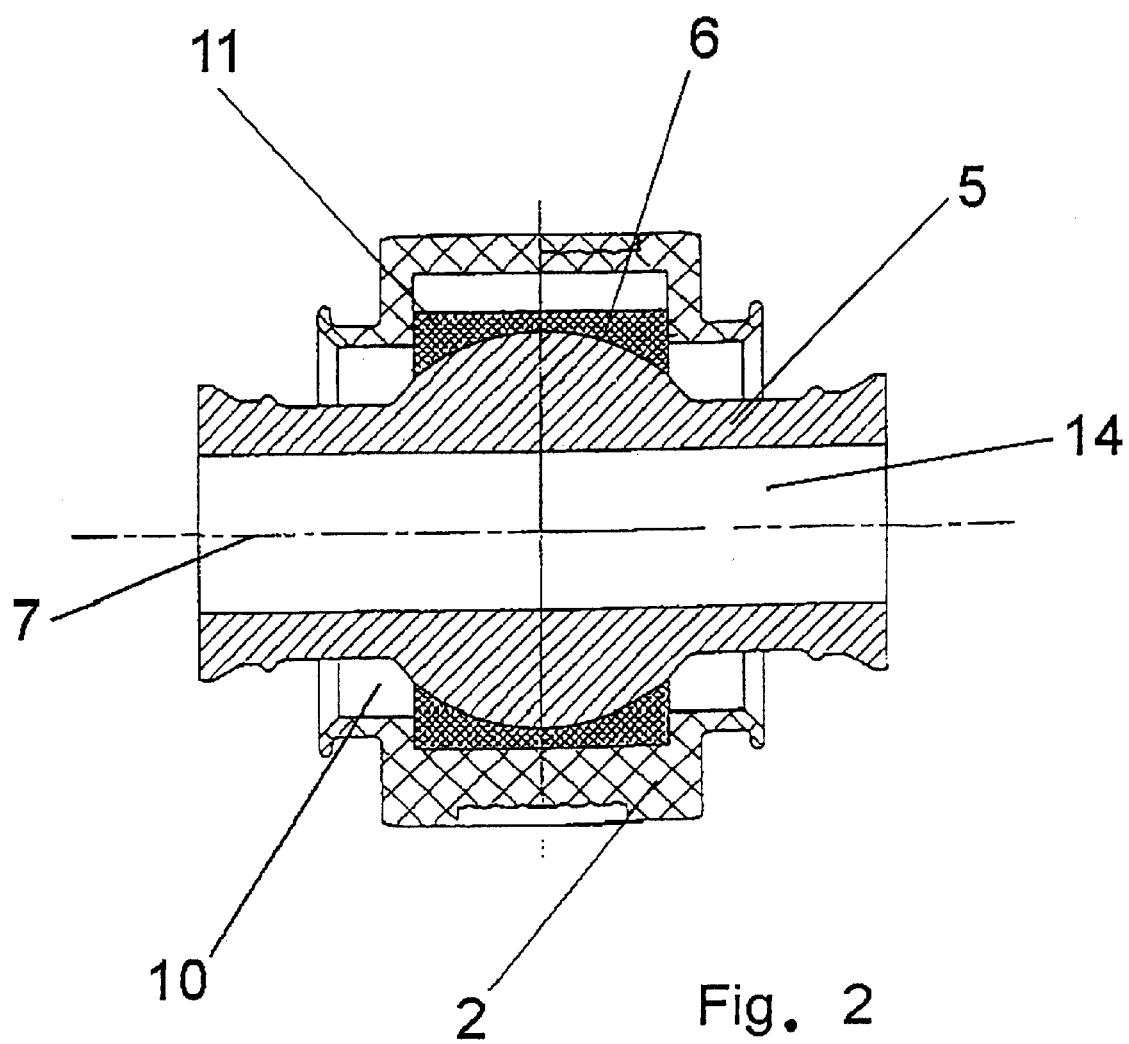
FIG. 2 is a sectional view through the ball sleeve joint according to FIG. 1.

Referring to the drawings in particular, a ball sleeve joint, designated by 1 as a whole, comprises essentially a joint housing 2 and a ball sleeve 5 arranged within the joint housing. The ball sleeve 5 is usually manufactured from metal and comprises a central through hole 14, as is apparent from FIG. 2. On its outer surface, the ball sleeve 5 is provided with a bearing surface 6, which usually has a spherical shape. The spherical bearing surface 6 is surrounded by a bearing shell 11, whose inner hole is adapted correspondingly to the shape of the bearing surface 6. The bearing shell 11 itself is in turn fixed in a cylindrical recess 10 of the joint housing 2.

Figure 1:
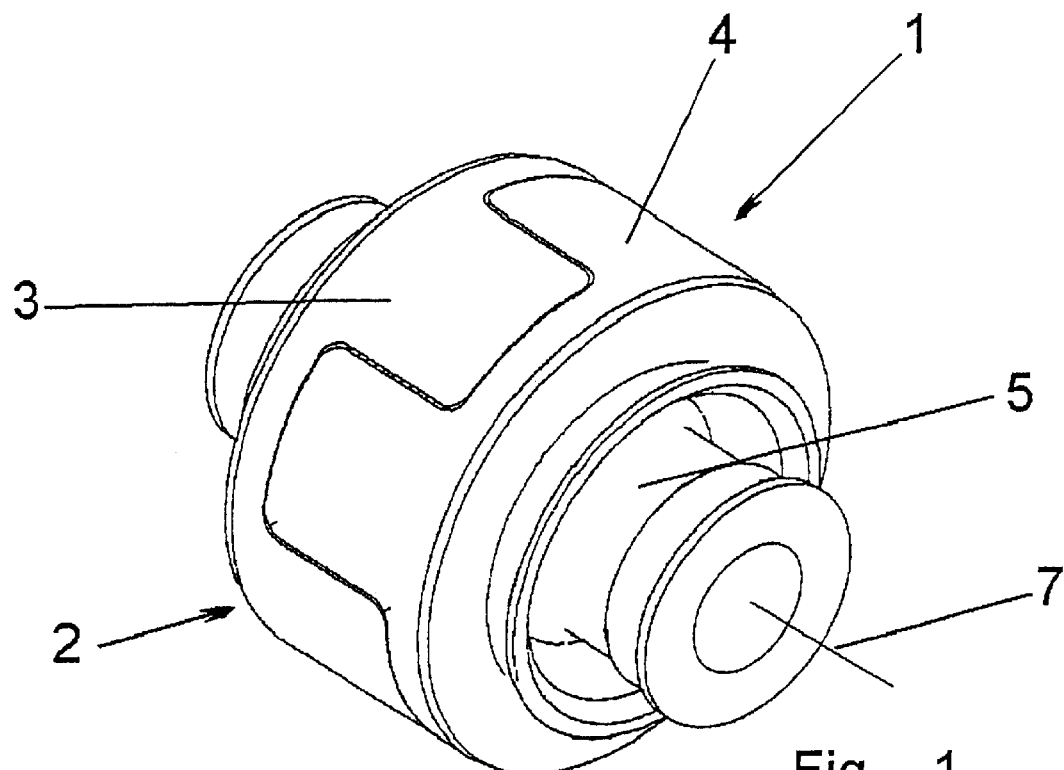
FIG. 1 is a perspective general view of the ball sleeve joint according to the present invention.

As is apparent especially from FIG. 1, the joint housing 2 comprises in the exemplary embodiment being shown two housing halves 3, 4, which are symmetrical in relation to a plane extending at right angles to the axial longitudinal axis 7. Uniform housing halves can be used for the assembly of a ball sleeve joint due to the symmetrical design of the housing halves 3 and 4. The design of one housing half 3 or 4 is shown specifically in FIG. 3.

One housing half 3 or 4 has corresponding elastic toothed elements, which are designed in one housing half either as detents projecting in the axial direction or as locking recesses 9 arranged between the detents 8. During the assembly of the joint housing, the detents 8 and locking recesses 9 of the housing halves are placed in relation to one another such that one detent 8 and one locking recess 9 each are located opposite each other. The housing halves 3 and 4 can this be pushed into one another in a finger-like manner and then form a closed joint housing unit.

Figure 3:
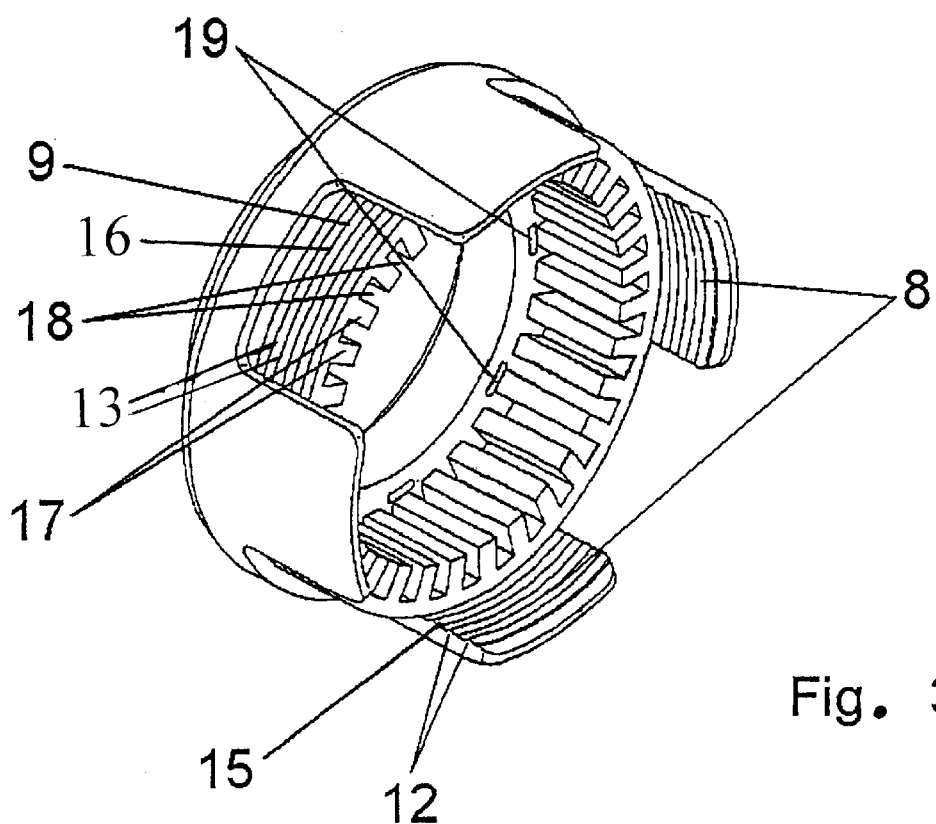
FIG. 3 is a perspective view of a housing half of the exemplary embodiment from FIGS. 1 and 2.

FIG. 3 also shows that both the detents 8 and the locking recesses 9 are provided with mutually corresponding locking cams 12 and 13, respectively. The locking cams 12 of the detents 8 are arranged on the inner side pointing toward the central axial longitudinal axis 7 of the joint housing 2, a number of locking cams 12 being arranged in parallel next to one another in the axial direction. The locking cams 12 are designed as projecting cams, while a slightly recessed depression 15 is located between two adjacent locking cams 12 each. The locking recesses 9 are shaped analogously to the detents 8, but the locking cams 13 are located here on the outer side of the locking recesses facing away from the axial central longitudinal axis 7 of the joint housing 2, but the locking cams 13 are likewise arranged in parallel next to one another, projecting to the outside. A slight depression 16 is present between the adjacent locking cams 13 each. If the two housing halves 3, 4 are displaced toward one another in the axial direction after the insertion of the ball sleeve 5 within the framework of the assembly of the ball sleeve joint 1, in which case the housing halves 3 and 4 are to be aligned such that one detent 8 and one locking recess 9 are located opposite each other, one or more locking cams 12 or 13 snap into the corresponding depressions 15 and 16 between the locking cams at the moment at which the corresponding detent has been introduced deep enough into the locking recess 9, so that a firm connection of the housing halves 3 and 4, which is fixed in the axial direction, is established. Due to the use of plastic material for the housing halves, the projecting detents 8 have a relatively high elasticity in the radial direction, so that the forces that are necessary for fitting together or locking the housing halves 3 and 4 are extremely weak, but stable fixation of the housing halves is nevertheless achieved.

FIG. 3 also shows a special design of the recess 10 of the joint housing 2, which accommodates the bearing shell 11. On its inner side facing the central longitudinal axis 7, the cylindrical recess 10 has a rather large number of projecting bearing pads 17, which support the bearing shell 11 in the assembled state. Depressions, which contribute, e.g., to an additional weight reduction of the entire housing halves because of the plastic material missing there, are located between the bearing pads 17. Moreover, a number of projecting cams 19, which prevent the bearing shell 11 from being able to rotate in relation to the housing 2 in the assembled state, are provided within the recess 10.

While a specific embodiment of the invention has been shown and described in detail to illustrate the application of the principles of the invention, it will be understood that the invention may be embodied otherwise without departing from such principles.

What is claimed is:

1. A ball sleeve joint comprising a joint housing defining a recess; a ball sleeve with a spherically designed bearing surface; a bearing shell surrounding the bearing surface, said bearing shell being accommodated in said recess of said joint housing, said joint housing being formed from at least two substantially identical housing parts, wherein the housing parts each have spaced apart elastic tooth detent elements extending in an axial longitudinal direction of the ball sleeve joint parallel to a central longitudinal axis of the ball sleeve joint and locking recesses disposed between adjacent axially extending tooth elements and extending in an axial longitudinal direction of the ball sleeve joint parallel to a central longitudinal axis of the ball sleeve joint, each of said elastic tooth elements of one of said housing parts being locked with a corresponding locking recess of another of said housing parts in an assembled state of the joint housing, on an inner side pointing toward the central longitudinal axis of said joint housing, said detents have a plurality of locking cams, extending at right angles to the central longitudinal axis, arranged in parallel next to one another and projecting toward the central longitudinal axis, with depressions located between said locking cams on an outer side facing away from a central longitudinal axis of said joint housing, said locking recesses have a plurality of said locking recess cams, which extend at right angles to the central longitudinal axis, said locking recess cams being arranged in parallel next to one another and projecting to an outside with depressions located between said locking recess cams.

2. A ball sleeve joint in accordance with claim 1, wherein the tooth detent elements are arranged at spaced locations from one another on the outer circumference of each of the housing parts wherein a detent of one said housing part is in a functional connection with a locking recess of another said housing part in the assembled state of the joint housing.

3. A ball sleeve joint in accordance with claim 1, wherein the housing parts are manufactured from an elastic plastic polymer material.

4. A ball sleeve joint in accordance with claim 1, wherein the recess of the joint housing accommodating the bearing shell has a plurality of projecting cams for securing the inserted bearing shell against rotation.

5. A ball sleeve joint in accordance with claim 1, wherein the recess of the joint housing for accommodating the bearing shell has projecting bearing pads on its inner surface with depressions located between the bearing pads.

6. A ball sleeve joint comprising:
a joint housing defining a recess;
a ball sleeve with a bearing surface that coincide with a spherical shape;
a bearing shell surrounding the bearing surface, said bearing shell being accommodated in said recess of said joint housing, said joint housing comprising a first housing part with first housing part extending elastic elements and first housing part receiving elastic elements and a second housing part being substantially identical to said first housing part and with second housing part extending elastic elements and second housing part receiving elastic elements, each of said first housing part extending elastic elements being locked with a respective one of said second housing part receiving elastic elements in an assembled state of the joint housing and each of said second housing part extending elastic elements being locked with a respective one of said first housing part receiving elastic elements in the assembled state of the joint housing, said first housing part extending elastic elements being detents arranged at spaced locations from one another about a circumference of the first housing part and projecting in an axial longitudinal direction of the ball sleeve joint and said second housing part extending elastic elements being detents arranged at spaced locations from one another about a circumference of the second housing part and projecting in an axial longitudinal direction of the ball sleeve joint, said first housing part receiving elastic elements being recessed relative to an outer peripheral surface of the housing arranged between respective adjacent first housing part extending elastic elements and said second housing part receiving elastic elements being recessed relative to an outer peripheral surface of the housing and being arranged between respective adjacent second housing part extending elastic elements, wherein each of said housing part receiving elastic elements of one said housing part is in a functional connection with a recess of another said housing part in the assembled state of the joint housing whereby rotation of said first housing part relative to said second first housing part is prevented, wherein said first housing part and said second housing part are symmetrical with a plane of symmetry arranged at right angles to an axial longitudinal axis of the joint housing.

7. A ball sleeve joint in accordance with claim 6, wherein on an inner side pointing toward a central longitudinal axis of said joint housing, said housing part receiving elastic elements have a plurality of locking protruding portions extending at right angles to a central longitudinal axis, arranged in parallel next to one another and projecting toward the central longitudinal axis, with depressions located between said locking protruding portions.

8. A ball sleeve joint in accordance with claim 6, wherein on an outer side facing away from a central longitudinal axis of said joint housing, said receiving elastic elements have a plurality of locking protruding portions, which extend at right angles to central longitudinal axis, said locking protruding portions being arranged in parallel next to one another and projecting to an outside with depressions located between said locking cams.

9. A ball sleeve joint in accordance with claim 6, wherein the housing parts are manufactured from an elastic plastic material.

10. A ball sleeve joint in accordance with claim 6, wherein the joint housing accommodating the bearing shell has a recess surface with a plurality of projecting cams for securing the inserted bearing shell against rotation.

11. A ball sleeve joint claim 6, wherein the joint housing accommodating the bearing shell has an inner surface with projecting bearing pads with depressions located between the bearing pads.

12. A ball sleeve joint comprising:
a joint housing defining a recess;
a ball sleeve with a bearing surfaces that coincide with a spherical shape;
a bearing shell surrounding the bearing surface, said bearing shell being accommodated in said recess of said joint housing, said joint housing comprising a first housing part with fist housing part extending elastic elements and first housing part receiving elastic elements and a second housing part being substantially identical to said first housing part and with second housing part extending elastic elements and second housing part receiving elastic elements, each of said first housing part extending elastic elements being locked with a respective one of said second housing part receiving elastic elements in an assembled state of the joint housing and each of said second housing part extending elastic elements being locked with a respective one of said first housing part receiving elastic elements in the assembled state of the joint housing, said first housing part extending elastic elements being detents arranged at spaced locations from one another about a circumference of the first housing part and projecting in an axial longitudinal direction of the ball sleeve joint and said second housing part extending elastic elements being detents arranged at spaced locations from one another about a circumference of the second housing part and projecting in an axial longitudinal direction of the ball sleeve joint, said first housing part receiving elastic elements being recessed relative to an outer peripheral surface of the housing arranged between respective adjacent first housing part extending elastic elements and said second housing part receiving elastic elements being recessed relative to an outer peripheral surface of the housing and being arranged between respective adjacent second housing part extending elastic elements, wherein each of said housing part receiving elastic elements of one said housing part is in a functional connection with a recess of another said housing part in the assembled state of the joint housing whereby rotation of said first housing part relative to said second first housing part is prevented, wherein on an inner side pointing toward a central longitudinal axis of said joint housing, said housing part receiving elastic elements have a plurality of locking protruding portions extending at right angles to a central longitudinal axis, arranged in parallel next to one another and projecting toward the central longitudinal axis, with depressions located between said locking protruding portions and wherein on an outer side facing away from a central longitudinal axis of said joint housing, said receiving elastic elements have a plurality of locking protruding portions, which extend at right angles to central longitudinal axis, said locking protruding portions being arranged in parallel next to one another and projecting to an outside with depressions located between said locking protruding portions.

13. A ball sleeve joint in accordance with claim 12, wherein said first housing part and said second housing part are symmetrical with a plane of symmetry arranged at right angles to an axial longitudinal axis of the joint housing.

14. A ball sleeve joint in accordance with claim 12, wherein the housing parts are manufactured from an elastic plastic material.

* * * * *